United States Patent
Chang

(10) Patent No.: US 9,497,531 B2
(45) Date of Patent: *Nov. 15, 2016

(54) APPARATUS AND METHOD FOR OUTPUTTING AUDIO SIGNAL IN PORTABLE TERMINAL

(71) Applicant: Samsung Electronics Co., Ltd., Gyeonggi-do (KR)

(72) Inventor: Ju-Hee Chang, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 286 days.

This patent is subject to a terminal disclaimer.

(21) Appl. No.: 14/273,645

(22) Filed: May 9, 2014

(65) Prior Publication Data

US 2014/0241542 A1 Aug. 28, 2014

Related U.S. Application Data

(63) Continuation of application No. 12/783,786, filed on May 20, 2010, now Pat. No. 8,724,826.

(30) Foreign Application Priority Data

Jun. 9, 2009 (KR) ........................ 10-2009-0050972

(51) Int. Cl.
*G06F 17/00* (2006.01)
*H04R 1/10* (2006.01)
*H04M 1/60* (2006.01)
*H04M 1/725* (2006.01)

(52) U.S. Cl.
CPC ......... *H04R 1/1041* (2013.01); *H04M 1/6058* (2013.01); *H04M 1/72527* (2013.01); *H04M 1/72558* (2013.01); *H04R 2420/03* (2013.01); *H04R 2420/05* (2013.01)

(58) Field of Classification Search
CPC ......... H04M 1/6058; H04M 1/72527; H04M 1/72558; H04R 1/1041; H04R 2420/03; H04R 2420/05
See application file for complete search history.

(56) References Cited

U.S. PATENT DOCUMENTS

| 6,006,109 | A | 12/1999 | Shin |
| 6,999,586 | B2 | 2/2006 | Yun |
| 8,892,164 | B2 * | 11/2014 | Sherman ............ H04B 1/3816 455/41.2 |
| 2002/0118824 | A1 | 8/2002 | Yun |
| 2003/0104842 | A1 | 6/2003 | Choi et al. |
| 2004/0081099 | A1 | 4/2004 | Patterson et al. |

(Continued)

FOREIGN PATENT DOCUMENTS

| CN | 1675627 A | 9/2005 |
| CN | 1960175 A | 5/2007 |
| KR | 10-2004-0019221 A | 3/2004 |

*Primary Examiner* — Fan Tsang
*Assistant Examiner* — Eugene Zhao
(74) *Attorney, Agent, or Firm* — Cha & Reiter, LLC

(57) ABSTRACT

An apparatus and a method for outputting an audio signal in a portable terminal are provided. The portable terminal for outputting an audio signal includes an ear jack, a modem, and an amplifier. The ear jack connects the portable terminal with one of an earphone and an external apparatus. The modem detects whether one of the earphone and the external apparatus is connected to the ear jack. When connection of the external apparatus is detected, the amplifier high power-amplifies the audio signal and outputs the same to the external apparatus according to a control of the modem.

12 Claims, 2 Drawing Sheets

(56) References Cited

U.S. PATENT DOCUMENTS

| | | |
|---|---|---|
| 2004/0228496 A1 | 11/2004 | Lin et al. |
| 2006/0009984 A1 | 1/2006 | Lim |
| 2007/0098190 A1 | 5/2007 | Song et al. |
| 2007/0142942 A1 | 6/2007 | Hyatt |
| 2007/0223762 A1 | 9/2007 | Kwon et al. |
| 2007/0286436 A1 | 12/2007 | Isobe et al. |
| 2008/0159567 A1 | 7/2008 | Lesso et al. |
| 2008/0287076 A1* | 11/2008 | Shen .................... H04B 1/0475 455/114.3 |

* cited by examiner

APPARATUS AND METHOD FOR OUTPUTTING AUDIO SIGNAL IN PORTABLE TERMINAL

CROSS REFERENCE TO RELATED APPLICATIONS

The present application is a Continuation of U.S. patent application Ser. No. 12/783,786 filed on May 20, 2010. This application claims the benefit under 35 U.S.C. §119(a) of a Korean patent application filed in the Korean Intellectual Property Office on Jun. 9, 2009 and assigned Serial No. 10-2009-0050972, the entire disclosure of which is hereby incorporated by reference.

BACKGROUND

1. Technical Field

The present disclosure relates to an apparatus and a method for outputting an audio signal in a portable terminal. More particularly, the present disclosure relates to an apparatus and a method for outputting an audio signal when an external apparatus is connected via an ear jack.

2. Description of the Related Art

As a portable terminal is rapidly distributed due to convenience in its portability, service providers have been developing terminals that provide various functions in order to compete in the market. Accordingly, most conventional portable terminals are capable of providing applications, such as a Motion Picture Expert Group Audio Layer-3 (MP3) player or a media player, and games. In addition, they provide a function of outputting an audio signal generated while the application is reproduced to an external apparatus by connecting the external apparatus via an ear jack. An audio signal output from the portable terminal to the external apparatus is a signal intended for an earphone output, thus has a small output capacity of about 2-5 mW. To address this limitation, the external apparatus can be equipped with a high power amplifier for amplification of audio signals provided from the portable terminal. If the external device coupled to an ear jack is not equipped with a high power amplifier, a user has an inconvenience of listening to a low audio signal.

SUMMARY

An aspect of the present invention is to address at least the above-mentioned problems and/or disadvantages and to provide additional advantages described below.

Accordingly, an aspect of the present invention is to provide an apparatus and a method for outputting an audio signal in a portable terminal.

Another aspect of the present invention is to provide an apparatus and a method for outputting a high power-amplified audio signal when an external apparatus is connected via an ear jack in a portable terminal.

Still another aspect of the present invention is to provide an apparatus and a method for outputting a speaker output signal to an ear jack when an external apparatus is connected via the ear jack of a portable terminal.

In accordance with an aspect of the present invention, an apparatus for outputting an audio signal in a portable terminal includes: an ear jack for connecting the portable terminal with one of an earphone and an external apparatus; a modem for detecting whether one of the earphone and the external apparatus is connected to the ear jack; and an amplifier for, when connection of the external apparatus is detected, high power-amplifying the audio signal and outputting the same to the external apparatus.

In accordance with another aspect of the present invention, a method for outputting an audio signal in a portable terminal includes detecting whether one of an earphone and an external apparatus is connected via an ear jack, and when connection of the external apparatus is detected, high power-amplifying the audio signal and outputting the same to the external apparatus.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Figure 1:
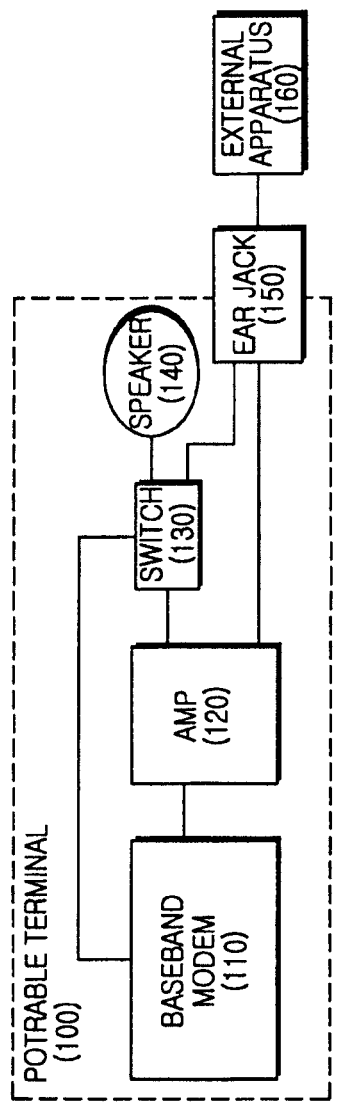
FIG. 1 is a block diagram illustrating a portable terminal according to an exemplary embodiment of the present invention.

FIG. 1 is a block diagram illustrating a portable terminal according to an exemplary embodiment of the present invention.

Referring to FIG. 1, the terminal 100 includes a baseband modem 110, an amplifier 120, a switch 130, a speaker 140, and an ear jack 150.

When an audio signal output event occurs, the baseband modem 110 detects whether an earphone or an external apparatus 160 is connected to the ear jack 150, and determines whether to output the audio signal to the speaker 140 or the ear jack 150. When it is detected that the earphone or the external apparatus 160 is connected to the ear jack 150, the baseband modem 110 determines which one of the earphone and the external apparatus 160 is connected to the ear jack 150. Here, the baseband modem 110 determines which one of the earphone and the external apparatus 160 is connected to the ear jack 150 using a voltage value of a signal input from the apparatus, which is connected to the ear jack 150. For example, when the voltage value falls within a threshold range, the baseband modem 110 may determine that the earphone has been connected. Conversely, when the voltage value does not fall within the threshold range, the baseband modem 110 may determine that the external apparatus 160 has been connected.

When determining that the external apparatus 160 has been connected to the ear jack, the baseband modem 110 outputs a signal representing connection of the external apparatus 160 to the amplifier 120 and the switch 130. In contrast, when determining that the earphone has been connected to the ear jack, the baseband modem 110 outputs a signal representing connection of the earphone to the amplifier 120. If is determined that no apparatus is connected to the ear jack, the baseband modem 110 outputs a signal indicative of no connection to the amplifier 120 and the switch 130.

The amplifier 120 amplifies an audio signal for use in speaker or the earphone depending on a signal input from the baseband modem 110, and outputs the same to a port connected to the connected apparatus. Here, the amplifier 120 amplifies an audio signal for use in speaker to a high level, and does not amplify an audio signal for use in earphone or amplifies the signal for use in earphone to a low level. For example, the amplifier 120 highly amplifies the audio signal for use in speaker to about 1 W, and low-amplifies the audio signal for use in earphone to about 2-5 mW. When a signal representing connection of the external apparatus 160 or a signal representing that no apparatus is connected is input from the baseband modem 110, the amplifier 120 amplifies the audio signal to a signal for use in speaker, and outputs the amplified signal to a port connected with the speaker 140. At this point, the amplifier 120 blocks off a port connected with the ear jack 150.

Moreover, when a signal representing earphone connection is input from the baseband modem 110, the amplifier 120 amplifies the audio signal to a signal for use in earphone, and outputs the amplified signal to a port connected with the ear jack 150. At this point, the amplifier 120 blocks off a port connected with the speaker 140.

The switch 130 performs switching according to a control signal provided from the baseband modem 110, and provides an audio signal output from the amplifier 120 to the speaker 140 or the ear jack 150. That is, when the external apparatus 160 is connected to the ear jack 150, the switch 130 performs switching such that an audio signal output from the amplifier 120 is input to the ear jack 150 according to a control signal provided from the baseband modem 110. When the external apparatus 160 is not connected to the ear jack 150, the switch 130 performs switching such that an audio signal output from the amplifier 120 is input to the speaker 140 according to a control signal provided from the baseband modem 110.

The speaker 140 outputs an audio signal provided from the amplifier 120. The ear jack 150 outputs an audio signal provided from the amplifier 120 to the external apparatus 160 or the earphone that is being connected.

Figure 2:
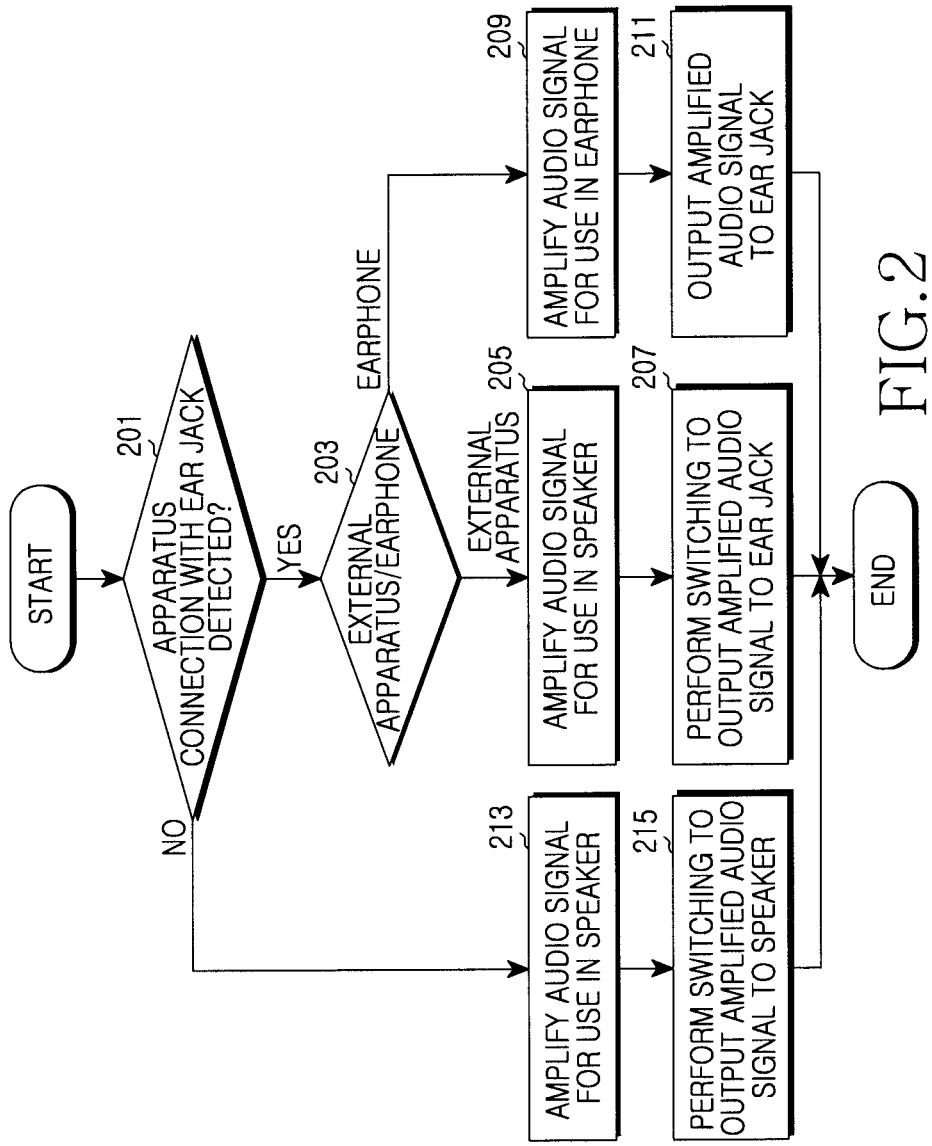
FIG. 2 is a flowchart illustrating a procedure for outputting an audio signal in a portable terminal according to an exemplary embodiment of the present invention.

FIG. 2 is a flowchart illustrating a procedure for outputting an audio signal in a portable terminal according to an exemplary embodiment of the present invention.

Referring to FIG. 2, the portable terminal detects whether an apparatus is connected to the ear jack 150 in step 201. If so, the portable terminal determines whether the apparatus connected to the ear jack 150 is the external apparatus 160 or the earphone in step 203. Here, the portable terminal may determine whether the apparatus is connected to the ear jack 150, and determine which one of the earphone and the external apparatus 160 is connected to the ear jack 150 using a voltage value of a signal input from the apparatus connected to the ear jack 150. For example, when a voltage value from the ear jack 150 falls within a threshold range, the portable terminal may determine that the earphone has been connected. When the voltage value does not fall within the threshold range, the portable terminal may determine that the external apparatus 160 has been connected.

When the connected apparatus is the external apparatus, the portable terminal amplifies an audio signal as a signal for use in speaker in step 205, and performs switching and outputs the audio signal amplified for use in speaker to the ear jack 150 in step 207. After that, the portable terminal ends the algorithm according to an exemplary embodiment of the present invention.

In contrast, when the connected apparatus is the earphone, the portable terminal amplifies an audio signal as a signal for use in earphone in step 209, and outputs an audio signal amplified for use in earphone to the ear jack 150 in step 211. After that, the portable terminal ends the algorithm according to an exemplary embodiment of the present invention.

Meanwhile, when the apparatus is not connected to the ear jack 150 as a result of the detection in step 201, the portable terminal amplifies an audio signal as a signal for use in speaker in step 213, and performs switching and outputs the audio signal amplified for use in speaker to the speaker in step 215. After that, the portable terminal ends the algorithm according to an exemplary embodiment of the present invention.

In the above description, the amplifier outputs a signal amplified for use in speaker to a port connected with the speaker, and outputs a signal amplified for use in earphone to a port connected with the ear jack, so that when the external apparatus is connected, the signal amplified for use in speaker is output to the external apparatus using the switch. This assumes a case that includes physically divided two amplifiers, that is, an amplifier for the speaker and an amplifier for the earphone. Alternatively, a single amplifier can be provided to perform amplification for both the speaker and the earphone, and the switch is not required. In this case, when the external apparatus is connected, the amplifier may amplify an audio signal for use in speaker and output the same to the ear jack.

In addition, to obtain a stereo effect, the portable terminal may output a high power-audio signal amplified for use in speaker to the speaker and the ear jack connected with the external apparatus, simultaneously.

According to an exemplary embodiment of the present invention, when an external apparatus is connected via the ear jack, the portable terminal switches a high power-amplified audio signal to be output to the speaker, and outputs the audio signal to the ear jack, so that even when the external apparatus does not have an audio amplifier, the portable terminal may provide a high power-audio signal to a user without the audio amplifier, and thus manufacturing costs of the external apparatus may be reduced. In addition, in the case where a user wants a higher power-audio signal, the portable terminal may easily provide a higher power-audio signal using an audio amplifier provided to the external apparatus.

The above-described methods operable in one or more of the illustrated controllers according to the present invention can be realized in hardware or via execution of software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A portable terminal for outputting an audio signal, comprising:
    an ear jack for connecting the portable terminal to one of an earphone and an external apparatus, wherein the external apparatus includes a speaker without a power amplifier;
    a baseband modem for detecting whether one of the earphone and the external apparatus is connected to the ear jack based on a voltage value of a signal input from the ear jack; and
    an amplifier for amplifying the audio signal to be a first audio signal when connection of the external apparatus is detected, and being configured to output the first audio signal to the external apparatus to be output by the speaker of the external apparatus according to a control signal of the controller;
    wherein the amplifier amplifies the audio signal to be a second audio signal or does not amplify the audio signal, with the non-amplified audio signal or the second audio signal to be output to the earphone when connection of the earphone is detected, and wherein the first audio signal is amplified by a higher power than the second audio signal.

2. The portable terminal of claim 1, further comprising a switch for performing switching to provide the second audio signal output from the amplifier to the earphone according to the control signal of the controller when connection of the external apparatus is detected.

3. The portable terminal of claim 2, wherein the switch performs switching to output the first audio signal from the amplifier to an internal speaker of the portable terminal when connection to one of the earphone and the external apparatus is not detected.

4. The portable terminal of claim 1, wherein the baseband modem determines whether one of the earphone and the external apparatus is connected to the ear jack based on comparing the voltage value of the signal input from the ear jack to a threshold range.

5. The portable terminal of claim 4, wherein the portable terminal is determined to be connected to the earphone if the voltage value falls within the threshold range.

6. The portable terminal of claim 4, wherein the portable terminal is determined to be connected to the external apparatus if the voltage value does not fall within the threshold range.

7. A method for outputting an audio signal in a portable terminal, the method comprising:
    detecting, by a baseband modem, whether one of an earphone and an external apparatus is connected to the portable terminal via an ear jack;
    wherein the external apparatus includes a speaker without a power amplifier when connection of the external apparatus is detected:
        amplifying the audio signal to produce a first audio signal, outputting the first audio signal to the external apparatus; and
    when connection of the earphone is detected:
        amplifying the audio signal to produce a second audio signal or not amplifying the audio signal, and outputting the second audio signal or the non-amplified audio signal to the ear jack, wherein the first audio signal is amplified by a higher power than the second audio signal.

8. The method of claim 7, wherein the outputting of the first audio signal comprises outputting the first audio signal to the ear jack connected with the external apparatus.

9. The method of claim 7, further comprising:
    when connection to one of the earphone and the external apparatus is not detected:
    amplifying the audio signal to produce a third audio signal, outputting the third audio signal to an internal speaker of the portable terminal.

10. The method of claim 7, wherein the detecting of whether one of the earphone and the external apparatus is connected to the portable terminal via the ear jack is performed by using a voltage value of a signal input from the ear jack when one of the earphone and the external apparatus is connected to the ear jack.

11. The method of claim 10, wherein the portable terminal is determined to be connected to the earphone if the voltage value from the ear jack falls within a threshold range.

12. The method of claim 10, wherein the portable terminal is determined to be connected to the external apparatus if the voltage value does not fall within a threshold range.

* * * * *